US010762539B2

(12) United States Patent
Murugesan et al.

(10) Patent No.: US 10,762,539 B2
(45) Date of Patent: Sep. 1, 2020

(54) RESOURCE ESTIMATION FOR QUERIES IN LARGE-SCALE DISTRIBUTED DATABASE SYSTEM

(71) Applicant: Amobee, Inc., Redwood City, CA (US)

(72) Inventors: Mummoorthy Murugesan, Fremont, CA (US); Jianqiang Shen, Santa Clara, CA (US); Yan Qi, Fremont, CA (US)

(73) Assignee: AMOBEE, INC., Redwood City, CA (US)

( * ) Notice: Subject to any disclaimer, the term of this patent is extended or adjusted under 35 U.S.C. 154(b) by 666 days.

(21) Appl. No.: 15/008,338

(22) Filed: Jan. 27, 2016

(65) Prior Publication Data

US 2017/0213257 A1    Jul. 27, 2017

(51) Int. Cl.
*G06Q 30/02*    (2012.01)

(52) U.S. Cl.
CPC ..... *G06Q 30/0277* (2013.01); *G06Q 30/0275* (2013.01)

(58) Field of Classification Search
CPC .................. G06Q 30/0277; G06Q 30/0275
See application file for complete search history.

(56) References Cited

U.S. PATENT DOCUMENTS

| 9,720,732 B1 * | 8/2017 | Shih ..................... G06F 9/4887 |
| 2012/0054175 A1 * | 3/2012 | Barsness ........... G06F 17/30477 707/719 |
| 2012/0215764 A1 * | 8/2012 | Barsness ........... G06F 17/30864 707/720 |
| 2014/0280192 A1 * | 9/2014 | Cronin ............... G06Q 30/0201 707/741 |
| 2014/0281748 A1 * | 9/2014 | Ercegovac .......... G06F 11/0727 714/49 |

OTHER PUBLICATIONS

Aji, Ablimit, et al: Hadoop GIS: A high perforannnce spatial data warehousing system over mapreduce. Attached. (Year: 2013).*
Chen, Songting, "Cheetah: A High Performance, Custom Data Warehouse on Top of MapReduce", Proceedings of the VLDB Endowment, vol. 3, No. 2, 2010, pp. 1459-1468.

(Continued)

*Primary Examiner* — Katherine Kolosowski-Gager
(74) *Attorney, Agent, or Firm* — Kwan & Olynick LLP

(57) ABSTRACT

Disclosed are systems and methods for managing queries on on-line advertisement data. The system includes a query engine device for receiving queries from and outputting query results to query client devices and a training engine for generating and adjusting a model for predicting an estimation of resource usage for execution of each received query based on each query's corresponding feature vector having values pertaining to the query and a system status. The query engine device is further configured to provide the estimation of resource usage for each query to the corresponding query client device and, in response, receive input from such corresponding query client device and specifying whether to proceed with the corresponding query. A database system receives input from each query's corresponding query client device as to whether to proceed with the query and, in response, initiates or inhibits execution of such query with respect to a database storage system.

21 Claims, 6 Drawing Sheets

(56) References Cited

OTHER PUBLICATIONS

Ganapathi, Archana et al., "Statistics-Driven Workload Modeling for the Cloud", IEEE, 2010, pp. 87-92.
Herodotou, Herodotos et al., "Profiling, What-if Analysis, and Cost-based Optimization of MapReduce Programs", Proceedings of the VLDB Endowment, vol. 4, No. 11, 2011, 12 pgs.
Morton, Kristi et al., "Estimating the Progress of MapReduce Pipelines", Computer Science and Engineering Dept., University of Washington, Seattle, WA, 4 pgs.
Song, Ge et al., "A Hadoop MapReduce Performance Prediction Method", IEEE International Conference on High Performance Computing & Communications, 2013, pp. 820-825.

* cited by examiner

| Feature | Current Feature Value | Suggested Feature Value | Resource Use Chg. |
|---|---|---|---|
| Table Number | 3 | 2 | -30% |
| Order by | 1 | 0 | -10% |
| Column Number | 10, 20, 15 | 10, 15 | -10% |
| . | . | . | . |
| . | . | . | . |
| . | . | . | . |

RESOURCE ESTIMATION FOR QUERIES IN LARGE-SCALE DISTRIBUTED DATABASE SYSTEM

TECHNICAL FIELD OF THE INVENTION

The present invention relates to on-line advertising, and more specifically to data mining for large-scale data systems.

BACKGROUND

In online advertising, internet users are presented with advertisements as they browse the internet using a web browser. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are purchased on a daily basis through public auctions hosted by real time bidding (RTB) exchanges. In many instances, a decision by an advertiser regarding whether to submit a bid for a selected RTB ad request is made in milliseconds. Advertisers often try to buy a set of ad impressions to reach as many targeted users as possible given one or more budget restrictions. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

Large enterprises easily spend more than $10M per year on market research. All of this money is spent in the tireless quest to identify the perfect audience target that will respond to marketing and promotions. One approach includes analyzing audience data sets that are accessible via a large scale distributed data system.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a database system for managing queries on on-line advertisement data is disclosed. The system includes a query engine device configured for receiving queries from a corresponding plurality of query client devices and outputting query results to such corresponding query clients, and a training engine configured for generating and adjusting a model for predicting an estimation of resource usage for execution of each received query based on each query's corresponding feature vector having a plurality of values pertaining to the query and a system status. The query engine device is further configured to provide the estimation of resource usage for each query to the corresponding query client device and, in response, receive input from such corresponding query client device and specifying whether to proceed with the corresponding query. The system further includes a database system for receiving input from each query's corresponding query client device as to whether to proceed with the query and, in response, initiating or inhibiting execution of such query with respect to a database storage system. By way of examples, the estimation of resource usage for each query specifies a predicted elapsed time, CPU usage, or I/O usage for such query. In one aspect, the estimation of resource usage for each query further specifies a predicted execution time, including map time and reduce time, for such query.

In a specific implementation, the estimation of resource usage for each query is provided prior to executing such query, which is subsequently executed if input specifies that such query is to be executed, and such query is, otherwise, inhibited if such input specifies that such query is not be executed. In one aspect, a model is generated and adjusted individually for each received query of each particular query client by generating an initial model for use with a plurality of queries having different feature vectors, received from a plurality of query clients. In this aspect, the initial model is configured to provide an estimation of resource usage for each of such new query clients' query based on such query's particular values of its feature vector, and the initial model has a plurality of weights for applying to the feature vector of the newly received queries. Also, prior to adjusting the weights of the initial model, actual resource usage is tracked during execution of each newly received query having different feature vectors. For each particular query client, the weights of the initial model are dynamically adjusted so as to generate an adjusted model for use with such particular query client's subsequently received queries.

In one embodiment, the weights are only adjusted if a condition is met when comparing actual resource usage and estimation of resource usage for executing a current query from such particular query client. In a further aspect, the condition is met for a particular query client if the actual resource usage for executing such particular query client's query differs from the estimation of resource usage of such particular query client's query by a predefined threshold. In yet a further aspect, the training engine is further configured to dynamically customize a different model for each particular query client.

In another example, the different feature vectors include different combination of values for a plurality of query parameters for each query's content, a plurality of execution parameters for each query, a plurality of database system resource specifications for each query client, and a plurality of database system operating parameters. In another embodiment, the query parameters include one or more of the following: a specification of query text, a specification of type and number of tables, a specification of number and type of aggregate functions, a specification of number and type of list function tables, a specification of presence of "order by" clauses, a specification of number and type of columns in each referenced table, a specification for presence of "having" clauses, a specification of number and types of nesting, a specification of number of queried days or other queried timeframe, or a specification of presence and type of a filtering condition. In another aspect, the estimation of resource usage includes a predicted mapping time, a predicted reducing time, and a predicted total elapsed time. In this aspect, the actual resource usage may include an actual mapping time, an actual reducing time, and an actual total elapsed time, and the condition is met when a difference between any time metric of the estimation of resource usage and actual resource usage is above a predefined threshold. In another example, the weights are only adjusted until a difference between the actual resource usage and the estimation of resource usage is minimized. In yet another implementation, the weights are only adjusted until a difference between the actual resource usage and the estimation of resource usage is changed by a predefined percentage so that the estimation of resource usage moves closer to, but does not equal, the actual resource usage.

In another embodiment, the query engine device is further configured to provide to the corresponding query client device a suggestion for changing each query so as to reduce the query's estimation of resource usage, and the suggestion includes a predefined number of feature vector values that contribute the most to the estimation of resource usage.

In an alternative embodiment, the invention pertains to a method that includes (i) receiving queries from a corresponding plurality of query client devices, (ii) generating and adjusting a model for predicting an estimation of resource usage for execution of each received query based on each query's corresponding feature vector having a plurality of values pertaining to the query and a system status, and (iii) providing the estimation of resource usage for each query to the corresponding query client device and, in response, receiving input from such corresponding query client device and specifying whether to proceed with the corresponding query and, in response, initiating or inhibiting execution of such query with respect to a database storage system. In another embodiment, the invention pertains to one or more computer readable media having instructions stored thereon for performing this method.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Figure 1:
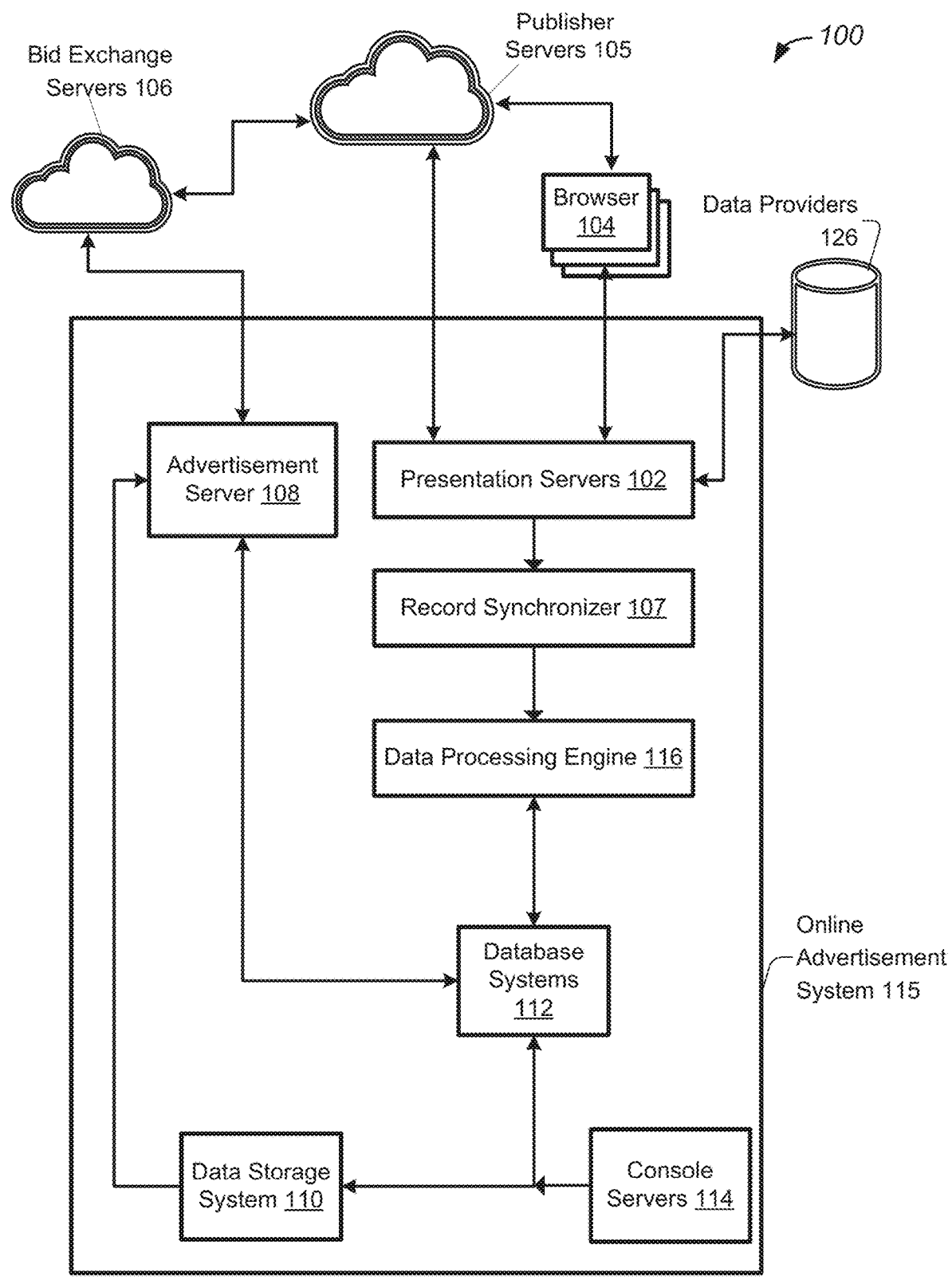
FIG. 1 illustrates a diagram of an example advertisement system configured in accordance with some embodiments.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory.

In certain data mining applications, a data warehousing system is typically configured to manage billions of audience records and support ad-hoc data analytics through flexible query protocols, such as CQL (Cheetah Query Language). For example, a data mining system may take the form of a petabyte scale data warehouse that is built on a distributed system, such as the Hadoop® system. Such a data management platform (DMP), which holds data sets that provide insight into customers' online actions and that profile hundreds of millions of customers and prospects at rapidly increasing levels. Combined with the rich ecosystem of third party behavioral and demographic data available within a DMP's marketplace, marketers now have access to some of the most spectacular market research datasets ever generated.

Queries on such large data sets may vary significantly in their execution time and other resource usage, such as execution time or CPU usage. For instance, some queries may take a few minutes, while other queries can take hours or days. In certain cases, query clients may find it useful to know the expected costs for their query prior to submitted the query so that they can determine whether to submit their query or schedule their query for another time. In other cases, a query client may simply wish to know an estimated finish time for their query so they can know when to expect results. Accordingly, there is a need to provide mechanisms for estimating query costs.

Example On-Line Advertisement Systems:

Prior to describing embodiments of a query estimation system, one example advertisement system will now be described so as to provide a context for application of such estimation embodiments. Although certain embodiments of a query estimation system are described below in the context of an on-line advertisement system, other types of big data applications may also utilize such estimation system.

FIG. 1 illustrates a diagram of an example advertisement system 100 configured in accordance with some embodiments. System 100 may include online advertisement and data management system 115, which may be used by an online advertisement service provider to provide advertisement services to one or more entities, such as advertisers.

The online advertisement and data management system 115 may work with any number of external servers, such as publisher servers 105 that provide any suitable type of displayable, executable, audible, or visual media content to users/audience via a user's physical device or on the publisher's device or system. For example, media content may include videos, music, text, games, etc. The content may also pertain to various categories, such as news, entertainment, educational, finance, sports, travel, etc. In a specific implementation, publishers provide media content, such as web pages, from server devices to client devices that are accessible by audience members/users. Example client devices include tablet computing devices, laptop computing devices, personal digital assistant (PDA) devices, mobile phones (e.g., smart phones), desktop computers, televisions, wearable computers, household devices, etc. Each client device may be configured with any suitable hardware and/or software (e.g., browsers and browser add-ins/plug-ins, operating systems for downloading and execution of apps on mobile devices, etc.) that operate in cooperation with the publisher devices/systems for receiving and presenting media content.

Prior to providing requested media content to users, the publishers 105 may also sell ad spaces with respect to such media content. Advertisers at the demand side have ads to place with publisher-provided media content. For instance, an advertiser pays to have an ad placed in an ad space of a particular web page that is sold by a publisher. An ad space may be available on web pages and other types of media, such as mobile device apps, games, coupons, videos, etc.

The publisher servers 105 may be configured to generate bid requests, which are forwarded to advertisement servers 108 (via a bid exchange server 106). In response to the bid requests, advertisement servers 108 generate one or more bid responses based on various advertisement campaign criteria. Additionally, one or more of the advertisement servers 108 may form part of online advertisement and data management system 115 or may be external to such system 115. Such bid responses may be transmitted and handled in cooperation with a bid exchange server 106 that together select an optimum bid for transmitting to the sender of the bid request, e.g., one of publisher servers 105, to be presented, along with the media content, to the user.

The bid exchange server 106 generally runs an auction to determine a price of a match between an ad and a web page. In essence, bid exchanges are the markets providing mechanisms for facilitating bidding processes between the demand and supply sides. The ad exchanges may be implemented on any suitable number and type of computing devices.

Advertisement servers 108 may also be configured to store budget data associated with one or more advertisement campaigns, and may be further configured to implement the one or more advertisement campaigns over a designated period of time. In some embodiments, the implementation of the advertisement campaign may include identifying actions or communications channels associated with users targeted by advertisement campaigns, placing bids for impression opportunities, and serving content upon winning a bid. In some embodiments, the content may be advertisement content, such as an Internet advertisement banner, which may be associated with a particular advertisement campaign. The terms "advertisement server" and "advertiser" are used herein generally to describe systems that may include a diverse and complex arrangement of systems and servers that work together to display an advertisement on a user's device. For instance, this system will generally include a plurality of servers and processing nodes for performing different tasks, such as bid management (e.g., advertisement servers 108), bid exchange (e.g., bid exchange servers 106), advertisement and campaign creation, content publication (e.g., publisher servers 105), etc.

Demand side platforms (DSP), such as advertisement server 108, may be generally configured to manage advertising campaigns on behalf of advertisers although some advertisers may also work directly with bid exchange servers. Given a user requesting a particular web page, a DSP is able to find the best ad for the user. The best ad may be selected from the ads managed by the DSP. For each ad selected, various constraints (mostly selected by the advertisers, but some by the ad exchange, the publisher, and the DSP) are met.

Online advertisement and data management system 115 may further include various components, such as one or more presentation servers 102, for managing online data for facilitation of online advertising. According to some embodiments, presentation servers 102 may be configured to aggregate various online advertising data from several data sources, such as data providers 126. The online data may be obtained or accessible as $1^{st}$ and $3^{rd}$ party data from various data suppliers, such as first parties (the advertisers themselves) or third parties (independent data suppliers).

The online advertising data may include live Internet data traffic that may be associated with users, as well as variety of supporting tasks. For example, the online advertising data may include one or more data values identifying various impressions, clicks, data collection events, and/or beacon fires that may characterize interactions between users and one or more advertisement campaigns. As discussed herein, such data may also be described as performance data that may form the underlying basis of analyzing a performance of one or more advertisement campaigns. In some embodiments, presentation servers 102 may be front-end servers that may be configured to process a large number of Internet users and associated SSL (Secure Socket Layer) handling. The front-end servers may be configured to generate and receive messages to communicate with other servers in system 100. In some embodiments, the front-end servers 102 may be configured to perform logging of events that are periodically collected and sent to additional components of system 100 for further processing.

Presentation servers 102 may be communicatively coupled to one or more data sources such as data providers 126, browsers 104, and publisher servers 105. In some embodiments, each browser 104 may be an Internet browser that may be running on a client machine associated with a user. Thus, a user may use a browser to access the Internet and receive advertisement content from one or more publisher servers 105. Accordingly, various clicks and other actions may be performed by users via browsers 104. Moreover, browsers 104 may be configured to generate various online advertising data described above. For example, various cookies, advertisement identifiers, beacon fires, and anonymous user identifiers may be identified by browser 104 based on one or more user actions, and may be transmitted to presentation servers 102 (as well as through publisher servers 105) for further processing.

Various additional data sources may also be communicatively coupled with presentation servers 102 and may also be configured to transmit identifiers and online advertising data based on the implementation of one or more advertisement campaigns by various advertisement servers, such as advertisement servers 108. For example, these additional advertisement servers may include bid processing services, which may process bid requests and generate one or more data events associated with providing online advertisement content based on the bid requests. Thus, bid processing services of advertisement servers 106 may be configured to generate data events characterizing the processing of bid requests, bid response, and implementation of advertisement campaigns.

Such bid requests, bid responses, and event data may be transmitted to presentation servers 102.

In various embodiments, online advertisement and data management system 115 may further include record synchronizer 107, which may be configured to receive one or more records from various data sources that characterize user actions and data events described above. In some embodiments, the records may be log files that include one or more data values characterizing the substance of a user action or data event, such as specifying a click or conversion. The data values may also characterize metadata associated with a user action or data event, such as specifying a timestamp identifying when the user action or data event took place. According to various embodiments, record synchronizer 107 may be further configured to transfer the received records, which may be log files, from various end points, such as presentation servers 102, browsers 104, publisher servers 105, and advertisement servers 108 described above, to a data storage system, such as data storage system 110 or database system 112 described in greater detail below. Accordingly, record synchronizer 107 may be configured to handle the transfer of log files from various end points located at different locations throughout the world to data storage system 110 as well as other components of system 100, such as data processing engine 116 discussed in greater detail below. In some embodiments, record synchronizer 107 may be configured and implemented as a MapReduce system that is configured to implement a MapReduce job to directly communicate with a communications port of each respective endpoint and periodically download new log files.

In various embodiments, online advertisement system 115 may include data processing engine 116 which may be configured to perform any suitable data management, processing, or analyzing tasks on any type and size of data. For instance, data processing engine 116 may include modules for transforming and efficiently storing data received via log synchronizer 107. The data processing engine 116 may also be configured to analyze data for various advertisement purposes, such as campaign performance, audience targeting, reporting etc. For instance, the data processing engine 116 may be configured to perform data queries on big data stores for analyzing audience segments for advertisement purposes.

In various embodiments, online advertisement system 115 may also include database system 112 which may be configured to store data generated or accessed by data processing engine 116. Ingestion jobs may be scheduled at regular intervals (every few hours or daily) to generate different versions of the cache tables. These caches may be asynchronously loaded into a highly scalable distributed data store. In some embodiments, database system 112 may be implemented as one or more clusters having one or more nodes. For example, database system 112 may be implemented as a four-node RAC (Real Application Cluster). Two nodes may be configured to process system metadata, and two nodes may be configured to process various online advertisement data, which may be performance data, that may be utilized by data processing engine 116. In various embodiments, database system 112 may be implemented as a scalable database system which may be scaled up to accommodate the large quantities of online advertising data handled by system 100. Additional instances may be generated and added to database system 112 by making configuration changes. Several embodiments for redundant data warehousing, configured in accordance with one or more embodiments, are further described in U.S. patent application Ser. No. 14/535,577, filed Nov. 7, 2014, which is incorporated herein by reference in its entirety for all purposes.

In various embodiments, such large data processing contexts may involve performance and user data stored across multiple servers and storage devices or systems implementing one or more redundancy mechanisms configured to provide fault tolerance for performance and user data. In one example context, a reporting pipeline ingests log records attributing to user events such as impressions, clicks and actions. The pipeline can generate more than 20,000 caches. In one embodiment, these caches are consumed and presented by front-end applications. The pipeline pre-computes these amounting to several terabytes of data every day. In certain embodiments, the ETL (extract, transform, load) phase of the pipeline does most of the heavy lifting (join and group operations) via map-reduce and pig jobs and stores the pre-computed caches in a data storage system 110, such as a distributed file system.

In various embodiments, database system 112 may be communicatively coupled to console servers 114 which may be configured to execute one or more front-end applications. For example, console servers 114 may be configured to provide application program interface (API) based configuration of advertisements and various other advertisement campaign data objects. Accordingly, an advertiser may interact with and modify one or more advertisement campaign data objects via the console servers. In this way, specific configurations of advertisement campaigns may be received via console servers 114, stored in database system 112, and accessed by advertisement servers 108 which may also be communicatively coupled to database system 112. Moreover, console servers 114 may be configured to receive queries and output query results with respect to user or performance data, and may be further configured to generate one or more messages that transmit such queries to other components of system 100.

In various embodiments, the various engines and modules of the advertisement and data management system, such as data processing engine 116 or advertisement servers 108, or any their respective components may include one or more processing devices configured to manage advertising tasks and manage data received from various data sources, such as a data storage system operated and maintained by an online advertisement service provider, such as Turn® Inc. of Redwood City, Calif. In some embodiments, such processing devices may each include one or more communications interfaces configured to communicatively couple to other components and entities, such as coupling data processing engine 116 to a data storage system and a record synchronizer. Furthermore, each data processing component may include one or more processing devices specifically configured to process data associated with data events, online users, and websites. In another example, each module or engine may include multiple data processing nodes for processing large amounts of data, such as performance data, in a distributed manner. In one specific embodiment, each module and engine may include one or more application specific processors implemented in application specific integrated circuits (ASICs) that may be specifically configured to process large amounts of data in complex data sets, as may be found in the context referred to as "big data."

In some embodiments, the one or more processors may be implemented in one or more reprogrammable logic devices, such as a field-programmable gate array (FPGAs), which may also be similarly configured. The one or more processors may each include various input and output buffers for efficiently receiving data and outputting processed data, respectively. According to various embodiments, each system component or engine may be implemented as a controller, which may be a hardware controller. Moreover, each system component or engine may be configured to include one or more dedicated processing units that include one or more hardware accelerators configured to perform pipelined data processing operations. For example, operations associated with estimating query resource usage as described herein may be handled, at least in part, by one or more hardware accelerators included in console 114 and/or other components of database storage system 110 (or the system of FIG. 5).

Query Estimation Embodiments:

To estimate the resources for a query job running for a data mining application, certain factors can be considered. Example factors that affect a job's resource load may include the query complexity, the size of data input, the Hadoop cluster usage and operational status, resource allocation for each client, current query load, the size of intermediate and final results, etc. Due to the dynamic nature of a flexible protocol system, it may be challenging to make a good estimation based on such factors since each query can widely vary in complexity, data input size, cluster usage, results size, etc. For instance, CQL is an SQL-like query language allowing ad-hoc analytics so user queries can vary. Thus, the complexity of CQL queries tends to change significantly so that it is difficult to predict the workload. Additionally, every day there are terabytes of new data being ingested by the data system so that the input and output of a job can change. Adding new features to the query engine may also affect resource usage by particular jobs.

In a distributed computing environment, such as Hadoop, the computational resources are shared. The system usage varies over time, and the resources that a job can start with may be different at different points in the job execution. Additionally, the data mining application often implements a 'pay-as-you-go' strategy. For instance, depending upon the query client's requirement, the system capacity that can be exploited for the client's job can change.

A system that does not have such an estimation mechanism results in inefficient use of the data clusters by the users. Query clients often do not know how complex a query is by simply looking at the query text. For instance, query on an audience segment table is more complex than a query on clicks. Moreover, a query involving dimension table look-up is more complex than a query without it. In a very dynamic environment, where data arrives in huge amounts, and also features and optimizations are being added frequently, it becomes very difficult to estimate the query complexity and running time.

Certain embodiments of the present invention address the performance estimation problem in the highly dynamic distributed environment for executing SQL type of queries, such as CQL, Hive, or Pig. In one embodiment, a prediction system is configured to give an estimation of particular resources before a user executes a query. For instance, the prediction system is configured to provide an estimate of query complexity, such as how many slot hours are required to complete execution of the query in the system. In another example, the prediction system provides an estimate of the running time, such as how long the query is estimated to run in the current setting based on cluster load. These two estimates can be very useful for users in order to facilitate decision making for selecting which queries to run and in what order so as to better utilize their resources. These estimates may also help administrators set thresholds on queries so that alerts would be sent out if queries are expected to take much longer to complete than their estimated time.

Although statistics may be used to obtain such predictions, building and maintaining such statistics over a large amount of data in big data systems adds a significant amount of extra overhead. In a specific embodiment, a machine learning based approach is implemented to estimate query resource load. This learning approach generally creates a dynamic and adaptive setup in order to make accurate predictions on computing resources and query execution time.

Figure 2:
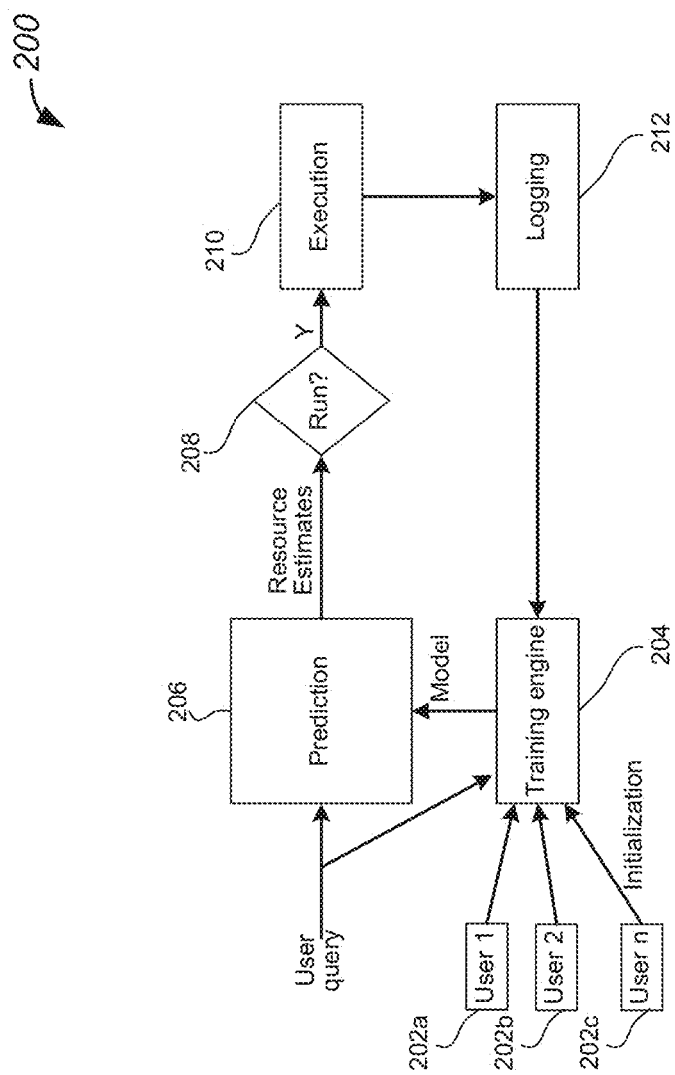
FIG. 2 is a diagrammatic representation of a query resource estimation system in accordance with a specific implementation of the present invention.

FIG. 2 is a diagrammatic representation of a query resource estimation system 200 in accordance with a specific implementation of the present invention. Portions of this system 200 may be implemented by any suitable type and number of hardware and/or software components or modules of an advertisement system (e.g., 115 of FIG. 1) or database mining system (e.g., system 500 of FIG. 5). For instance, portions of the estimation system 200 may be implemented by the data processing engine 116 of FIG. 1, which may be operable to work in conjunction with database systems 112 and data storage system 110.

As shown in FIG. 2, the query resource estimation system 200 may include a prediction module 206 for receiving queries (e.g., from console servers 114) and use a model to predict resource estimates for execution of such query. The model may be generated based on training data, which may include historical queries that have been executed and for which query features have been logged for each query as further described herein. A model may be built so as to predict execution time, such as map time and reduce time, or running time (e.g., elapsed time for producing results for a query) based on weighted query features or factors. The time of various other types of query operations, besides map and reduce, may be predicted for other types of database storage systems that use other database operations. Alternative embodiments of the present invention may include estimating CPU usage (e.g., number of processing units or blocks), predicting I/O usage (e.g., bytes read and written), in addition to time metrics.

Based on the predicted execution time (or "resource estimates"), it may then be determined whether the query is to be run (e.g., by block 208). If the query is to be run, execution may then be initiated (e.g., by execution module 210). A logging module 212 may also be operable to log query data that pertains to the execution of each received and executed query, such as query execution time, including map and reduce time, and various parameters of the query itself.

The logged data may include any suitable quantifiable or qualitative query data or feature vector, which is collected during or prior to query executions. For instance, a first type of logged query data or feature vector may include input data items from the query itself, while a second type of logged query data may include data items that pertain to execution of the query and are not present in the received query's content. A feature vector for a query may include values for any of the following data items referenced or used by the query: query text, the type and number of tables, number and type of aggregate functions, the list function tables, the presence of "order by" clauses, the number and type of columns in each referenced table, the presence of "having" clauses, number and types of nesting, number of queried days or other data timeframe, the presence of filtering conditions, type of filtering conditions, etc. Each feature vector can also specify whether tables are referenced by a query and, if so, which tables (e.g., a user data table, impressions table, clicks table, actions table, nested impressions table, nested clicks table, nested data table, etc.) are referenced by the query. In another example, the logged data sets and feature vectors can specify whether and which list functions (e.g., non-correlated list function, correlated list function along with the target table being accessed by the list function, etc.) are used by the query. Other types of query data sets may be logged, and their type depends on the particular query protocol. The logged data may be stored in any suitable storage system, such as a knowledge data base or meta data store.

Additionally, system status or operating data sets may be logged for training and use in adjusting the model for each type of query. Example system status parameters may include number of jobs, number or percentage of nodes, number of available map slots, number of available reducer slots, and other available resources, etc.

The training engine 204 may also receive or obtain user profile data sets, such as 202a-202c. User profile data may specify which resources are allocated to each user. Examples of user profile data includes percentage or number of server nodes, including percentage of mappers or reducers, including the priority of jobs, etc. Each client will have different resource allocation specifications, e.g., based on different levels of allocation that are purchased by each client. For instance, resource allocation may be dynamically changed by the database platform based on each query client's purchase level and availability of resources. The user profile data may be stored in any suitable storage system, such as a knowledge data base or meta data store.

The logged query data sets and user profile data sets can be used to evaluate the predicted query metrics, such as the elapsed time, against the actual query metrics for the same type of query. The process may then include adjustment of the model to more accurately predict query metrics if certain conditions are met as described further herein. That is, the actual query metrics may be used to adjust a model for predicting a query metric. Different query features in the model may be weighted differently to improve the prediction estimates of the model over time as various query factors change.

Figures 3, 4B:
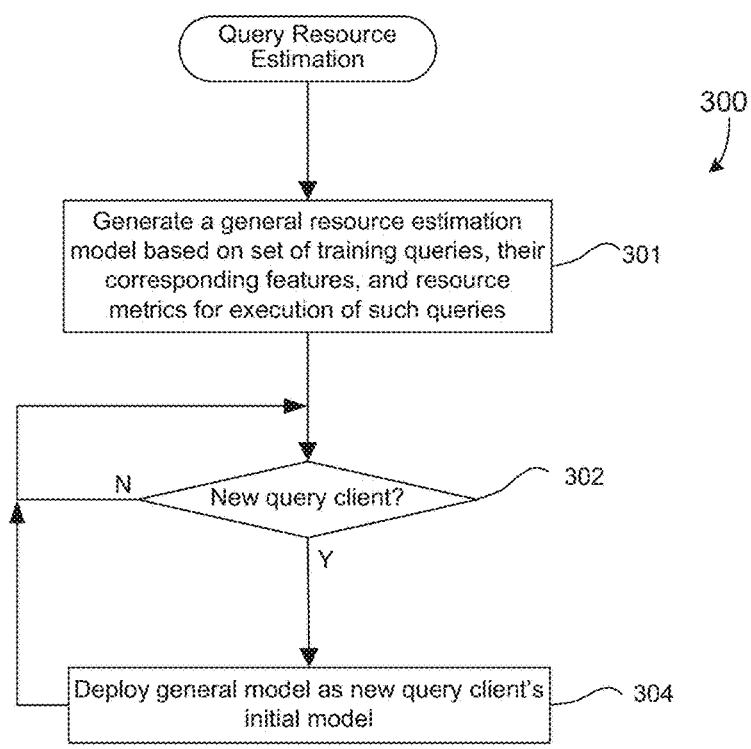
FIG. 3 is a flow chart illustrating a query estimation process in accordance with one embodiment of the present invention.
FIG. 4B is a diagrammatic representation of an example table of suggested query changes in accordance with a specific implementation.

Any suitable process may be used to implement the general features of the estimation system 200 of FIG. 2. FIG. 3 is a flow chart illustrating a query estimation process 300 in accordance with one embodiment of the present invention. A general resource estimation model may initially be generated based on a set of training queries, their corresponding features, and resource metrics for execution of such queries in operation 301.

The feature information of each training query may first be extracted as a feature vector $x=<x_1, x_2, \ldots x_n>$. For example, $x_1$ could represent the number of mappers, $x_2$ could represent the number of involved tables. A learned prediction model may then be generated based on the known training set of actual resource metrics and query data sets. For instance, the learned model may take the form of a linear model, represented as a weight vector $w=<w_1, w_2, \ldots w_n>$. A learned weight vector for the running cost (or elapsed time) may take the following form:

$$\text{Cost}=x\Box w=x_1*w_1+x_2*w_2, \ldots +x_n*w_n$$

Any combination of the query features for any suitable number of query metric types may be considered for this implementation. For instance, any of the above described logged query features may be used and weighted in one or more generated models for predicting one or more query metrics. For each particular metric, a different cost equation with different weights would be generated. Some query features, such as whether a particular table is involved in the query, can be given a binary value (1 or 0), depending on whether such feature is present or involved in the query. Other query features, such as number of involved tables, can simply be provided as the "real" number, such as number of tables. The weight can generally correspond to a weighted time value, such as number of seconds or other time unit (or other resource metric unit), that is associated with the presence of a query feature or value of a query feature. Each of the weights is multiplied with each corresponding feature value and added together to provide a total cost for such query. A model may be generated for other cost types, such as described herein.

Any suitable technique can be used to determine a set of model weights for the feature vector so as to accurately predict the resource usage based on the training data. For example, a linear regression technique may be used to find the weight vector based on the provided training queries for which the resource metrics are known. In this approach, the model weights can be fitted to the training data, which includes feature vectors and associated cost values. Fitting can entail using the least squares approach or an approach that minimizes the "lack of fit" in a predefined norm, such as with a least absolute deviations regression. Another model generation approach may include fitting the model to the training data by minimizing a least squares loss function, such as in a ridge regression (L2 norm penalty) and lasso regression (L1 norm penalty). Other estimation model generation techniques may include Bayesian linear regression, quantile regression, mixed modelling, α-trimmed mean, L-, M-, S-, and R-estimators, etc.

It may then be determined whether there is a new query client in operation 302. For example, a new query client that is associated with a particular unique identifier may initiate a query request or register with the database system. If there is a new client, the general model, which was based on the training data, may then be deployed as the new query client's initial model in operation 304. This general model can be used initially by each new client to estimate resources for each of their own queries. The training data may also be discarded. In effect, the model represents the historical data for all queries. A significant amount of physical storage space and processing load is saved by deleting the historical data.

This general model can initially be used by all new query clients, in one embodiment, this general model may continue to be used for all query clients and adjusted for use with all query clients. In a preferred embodiment, the general model is adjusted so as to be customized for each particular client. That is, each query client (e.g., advertiser) may be assigned their own dynamically adjusting model. Each client's model may be adjusted periodically after expiration of a predetermined time period or after each query from such client is processed. Each client's model will then tend to move towards being more accurate for such particular client and their historical query data.

As a result of the distributed nature of a datamining system, the same query type may have different query resource usage, depending on the particular operational and client-allocation status of the database storage system. That is, the query resource usage for a same query type may change over time.

A process for model adjustment for each client may be triggered by any suitable mechanism, such as expiration of a predefined time period, changes in how a query is processed (e.g., change in instance assignment for data, etc.), etc. That is, certain changes in how a particular query type is processed may trigger a process for determining whether to adjust the client's model, whether to present predicted/actual query use metrics to a client, whether to give a client the option to proceed with a query, etc.

Figure 4A:
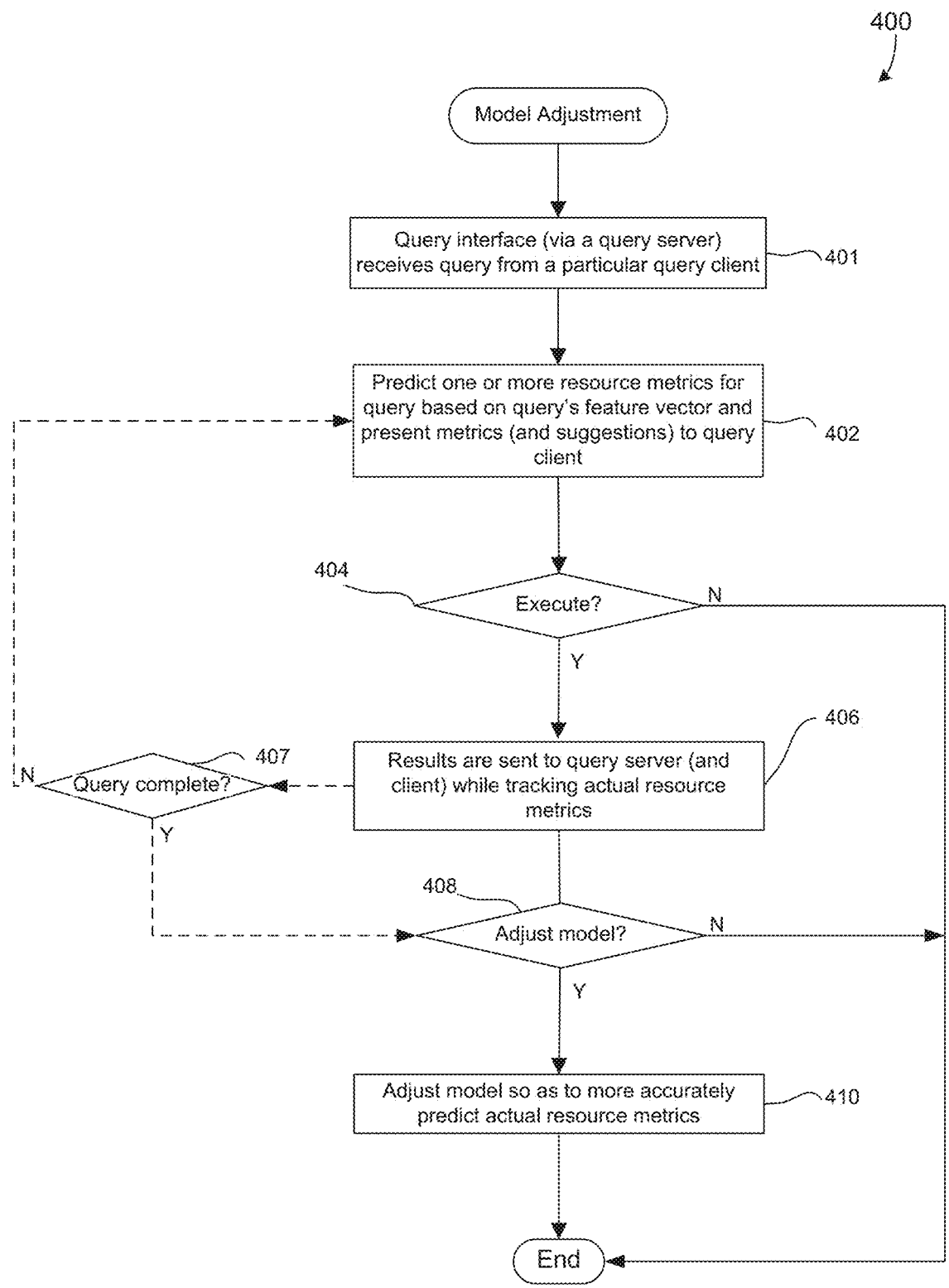
FIG. 4A is a flow chart illustrating a model adjustment procedure in accordance with one embodiment of the present invention.

FIG. 4A is a flow chart illustrating a model adjustment procedure 400 in accordance with one embodiment of the present invention. Initially, a query interface receives a query (via a query server) from a particular query client in operation 401. In general, query resources may be published and become visible to the query server. The query server may be implemented or configurable to reveal particular resources to particular query client applications so that a query client may make queries for particular query resources. For instance, each particular query client may have access to its own advertisement data and corresponding user data.

After a query is received, one or more resource metrics for the query may then be predicted based on the current query's feature vector (that includes profile data of the user who submitted the query) and then presented to the query client in operation 402. For instance, the general model may initially be used to predict elapsed time for a new client's query prior to submitting the query for execution. The elapsed time may be further broken down into an execution time (including map time and reduce time) and non-execution time periods that occur between query execution operations. The map time predicts the amount of time for the one or more mapping operations of the query and, likewise, the reduce time indicates a predicted amount of time for the one or more reduce operations. The execution time indicates the predicted total time for all execution operations of the query, while the elapsed time indicates the total elapsed time between initiation of the query and providing the query results.

Along with the predicted resource metrics, the process 400 may optionally present suggestions to the query client in operation 402. These suggestions may take the form of suggested changes to the query that will result in less resource usage (less time or CPU usage). These suggestions may also specify the type and amount of resource usage reductions that are predicted to result in making the suggested changes to the query. The query client can then submit the changed query as a replacement for the original query. For example, the estimation system may suggest changing or removing a predefined number of top weighted features from the query content to result in a certain percent reduction in CPU usage or execution time. Example suggested changes to the query may include reducing the number of referenced tables or list functions, removing certain referenced tables or list functions, etc.

FIG. 4B is a diagrammatic representation of an example table of suggested query changes (450) in accordance with a specific implementation. The suggested query changes may be presented in a graphical user interface of the client device. As shown, the table 450 includes a feature column for listing the top contributors to resource usage and a current feature value column for listing their respective values. For instance, the number of tables is 3, which contributes the most to the query resource usage. The second contributor is the presence of the "order by" clause, while the third contributing feature is the number of columns in each of the tables: 10, 20, and 15, respectively. The table 450 also includes a "suggested feature value" column and a predict "resource use change" column. For example, if the query table number drops to 2 (instead of 3), the resource usage is expected to drop by 30%.

In alternative embodiments, the features and corresponding weight values for a particular query client's model can be shown to the query client so that the query estimation process and how it's affected by different features are made transparent to the client. For example, the query client can see which features have higher weights for contributing to the resource usage calculation. That is, the model is human readable, which allows the query client to optimize queries.

After resource metrics are predicted, it may then be determined whether the current query is to be executed in operation 404. The user or query client may be presented with an option to select whether to proceed with the query after or while being presented with the query prediction, for example, via a client query interface. The user may decide that the current query will take too long, and then indicate through the client query interface that the query should not be executed. The procedure 400 may then end, for example, such that the query is dropped. Alternatively, the user or query client may indicate that the query can proceed to execute. In another example, the query client may submit an adjusted query (e.g., based on the suggested query feature changes) and indicate that execution is to commence for such adjusted query. In alternative implementations, the query client may be presented with an execution option only if the query resource estimation exceeds a predefined threshold. Otherwise, the query is automatically executed without the option for user intervention if the estimation is below such threshold.

If the query executes, results may be sent to the query server (and query client) and actual resource metrics are tracked (which may also be sent to the client) in operation 406. For example, map time, reduce time, total execution time, and total overall elapsed time may be tracked (and sent) during execution of the query. Various results may be sent during or after execution of the query.

Query estimation metrics may optionally be recalculated and presented during longer query executions. In the illustrated embodiment, it may be determined whether the query has completed in operation 407. In this optional embodiment while the query continues to execute, the estimation may be recomputed and presented to the user in operation 402. For example, the estimation may be recalculated periodically every predefined time period (e.g., every 20 minutes, every hour, etc.). The estimation may change because of various factors, such as changes to the system status or client allocation. For instance, the query volume may increase for the client's allocated resources, nodes may be taken off line, nodes may be deallocated from the client, etc. This option allows the user to stop the currently executing query if the estimation indicates the query is going to take a longer amount of time than the client is willing to wait. The features that changed and affected a change in the estimation may also be indicated to the query client. Suggested query changes may also be presented when the query's predicted resource usage changes as described above. For instance, the query client may be notified that the query's estimated completion time has increased by 1 hour due to an increase in query load, e.g., the percentage of available nodes has decreased. The query system will often change status since it is a multi-tenant system. In certain cases, the client may adjust the query or submit a new query.

After the query completes, it may then be determined whether the model (for the particular client) needs to be adjusted in operation 408. For instance, it may be determined whether the actual and predicted resource metrics are comparable to each other. More specifically, it may be determined whether any of the actual metrics, a portion of the actual metrics, or all of the actual metrics are within a predetermined threshold of the corresponding predicted metrics. If it determined that the differences between one or more actual vs. predicted metrics is more than a predetermined threshold, it may then be determined that the model is to be adjusted. In alternative embodiments, an alarm may be triggered when differences between actual and predicted metrics are above a predefined threshold. The alarm may cause processes for model adjustment to commence.

Any suitable adjustment approach may be utilized. However, the model for a particular client preferably retains accuracy with respect to all the historical data for such client, and does not change so much that the model is no longer accurate with respect to such historical data. Said in another way, the model is preferably adjusted so as to move towards complying more with the new observation, but not move away from complying with the past observations. For newer clients, the model for such new client may be adjusted more quickly during the first predefined number of queries made by such new client so that the model is customized to conform to the client's particular historical data as such data is collected. After the model for a client has been used by a predefined number of queries, the model adjustment process may slow down so that the model retains its accuracy with respect to the historical data and moves towards new observations as further described herein.

In a specific implementation, the current weight vector for a model may be adjusted using certain constraints. The weights can be altered so that the actual metrics are then predicted precisely or change by a predetermined amount (e.g., a predefined percentage of the difference) so that the predicated metrics move closer to the actual metrics, but not exactly matching the actual metrics. In this latter conservative approach, the predicted amounts will not fluctuate as much as in the case in which the model is adjusted to precisely fit the actual metrics.

In a specific example, the new model weight vector is $w_{t+1}$, the current weight vector is $w_t$; the current feature vector for the finished query is $x_t$; and the current cost is $y_t$. Given the above considerations, the weight vector can be updated based on the following optimization rule:

$$w_{t+1} = \min_w \frac{1}{2} \|w - w_t\|^2$$
$$\text{s.t. } \alpha \leq y_t - W \cdot x_t \leq \alpha$$

Where $\alpha$ is a given parameter, which is referred to as margin (in one embodiment, it is set as 1), $\|W-W_t\|$ is the distance between vector w and vector $w_t$. In other words, the search for a new set of weights $W_{t+1}$ is limited to those vectors that give prediction results close to the real cost (satisfy $\alpha \leq y_t - W \cdot x_t \leq \alpha$), and from those satisfied vectors, the one that is closet to $w_t$ can be selected. In general, the above optimization rule minimizes the distance between the current model and the adjusted model such that ("s.t.") a margin of 1 is not exceeded. The margin affects how often the model changes. For example, a margin of 0.1 would result in the model changing frequently so as to more closely match the current actual metrics. A margin of 1 seems to work well. It is also possible to periodically rerun the above rule over all collected old data to ensure better accuracy.

The queried data described above may include any type of data. In an online advertising system, the data sets may take the form of tables that include user profile data pertaining to any characteristics that were, are, or can be associated with a particular user. To protect a user's privacy, user profile data may be stored with an anonymized type of user identifier, such as an arbitrary or randomized identity, rather than the user's actual name, specific residency, or any other type of user identifying information. Examples of user profile data for a particular anonymized user u may include descriptive data, such as personal or professional interests, employment status, home ownership, knowledge of languages, age, education level, gender, race and/or ethnicity, income, marital status, religion, size of family, field of expertise, residential location (country, state, DMA, etc.), travel location, or predictive data, such as likelihood to consume content or perform an activity, such as clicking on an ad, visiting a page or purchasing a product or service, in the near future, etc.

The user profile data may also include browsing history information (or event data), such as pages visited, amount of time per page viewing, links clicked on, searches performed, actions or interactions taken, amount and type of purchases made, etc. The browsing history information may be expressed using any suitable one or more metrics, such as count, absolute or relative value, average, mean, frequency, time duration, etc. The user profile of user u may also include contextual data, such as where the user is currently located, the weather at such location, current events at such location, etc. For instance, the ad request may include a GPS (global positioning satellite) value or access point location for the user u, and other contextual data may be scraped from other databases, such as a weather or entertainment event web site for such location. The media content profile may identify various characteristics of the web page or ad space or ad placement that is available for purchase, such as one or more content category, ad placement position (e.g., top, side, or bottom of page), ad type (e.g., banner, video, pop-up), brand safety (e.g., absence of alcohol, violence, drugs, competitive brands), page quality (e.g., absence of cluttering images, prominent display of the ad), etc.

Example Database System Embodiments

Embodiments of the present invention may be implemented in any suitable network systems, such as described herein. The network may take any suitable form, such as a wide area network or Internet and/or one or more local area networks (LAN's). The network may be in the form of a data, mobile, cellular, plain old telephone network (POTN), or any combination thereof. Referring back to FIG. 1, the network 100 may include any suitable number and type of devices, e.g., routers and switches, for forwarding requests from each client to a particular server application, forwarding application results back to the requesting clients, or forwarding data between various servers or processing devices.

Embodiments of the present invention may also be practiced in a wide variety of network environments including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc., or any combination thereof. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

Figure 5:
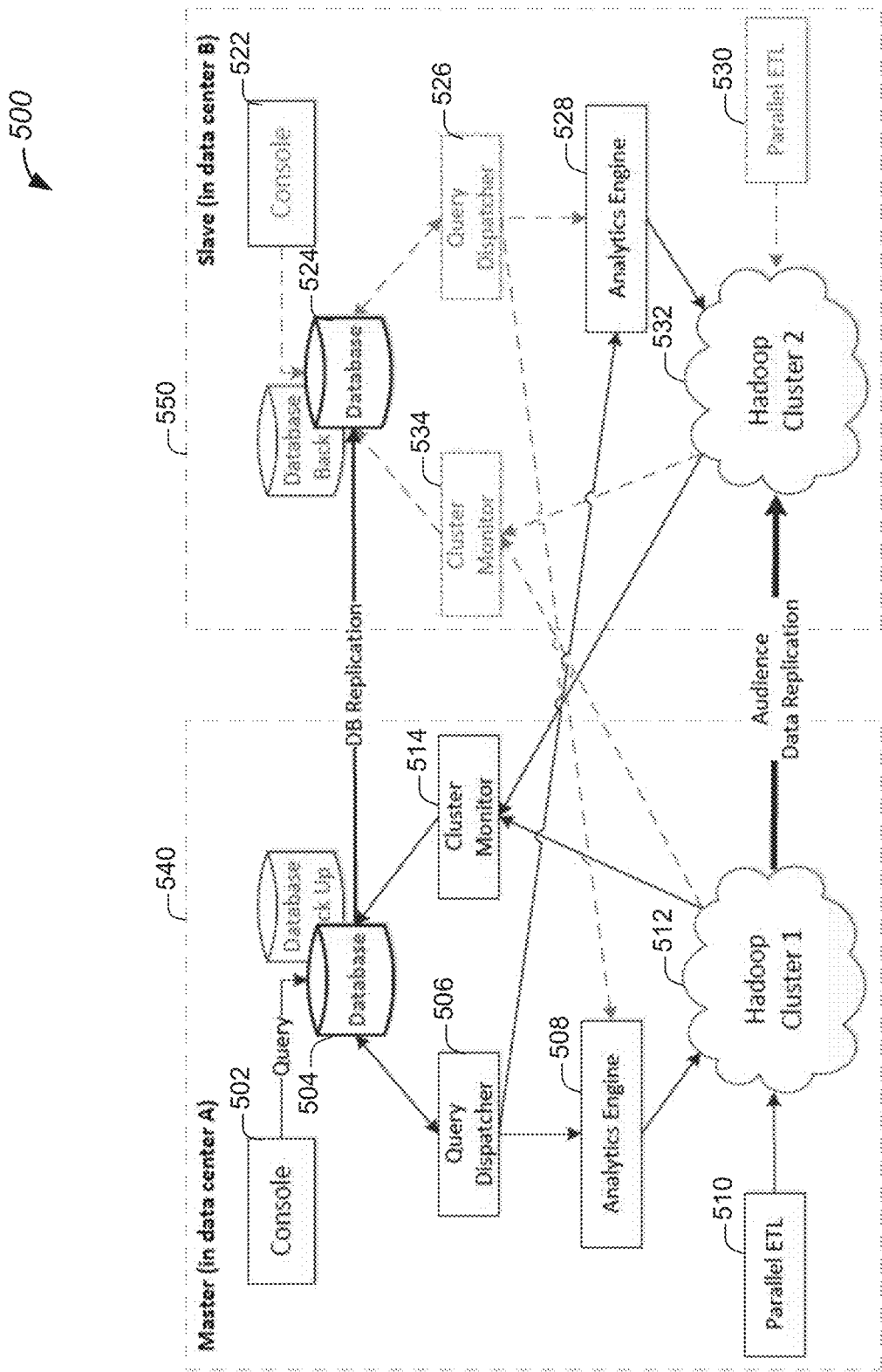
FIG. 5 illustrates a system for redundant data warehousing, configured in accordance with one or more embodiments.

The database systems may include any suitable number and type of components, including specially-configured servers, file system nodes, database storage devices, by way of examples, each having specially-configured interfaces, such as large and efficient input and output buffers, for quickly inputting and outputting large batches of data. FIG. 5 illustrates a system for redundant data warehousing, configured in accordance with one or more embodiments. The system shown in FIG. 5 may be used to receive large amounts of data for storage in a data storage system, such as data storage system 110 discussed above, and receive and manage queries, such as received via console 114 of FIG. 1.

The data storage system may be implemented at a first data center site 540, and the data center sites may communicate via high-speed network links. The stored data may also be made available for querying. The stored data may be replicated to a second data center site 550.

According to various embodiments, the system shown in FIG. 5 includes redundant components that are each positioned in a respective data center site. For instance, the data centers include consoles 502 and 522, databases 504 and 524, query dispatchers 506 and 526, cluster monitors 514 and 534, analytics engines 508 and 528, data clusters 512 and 532, and parallel ETLs 510 and 530.

According to various embodiments, the data centers may be configured in a master/slave architecture. In the configuration shown in FIG. 5, the first data center site 540 is configured as the master data center while the second data center site 550 is configured as the slave data center. Although the system shown in FIG. 5 includes only two data centers in communication in a single master/slave relationship, other configurations may include various numbers of data centers arranged in various relationships.

In some implementations, the master data center in a master/slave relationship may be responsible for primary data center responsibilities such as ingesting new data, receiving queries to query stored data, dispatching queries to the data clusters, and monitoring the data clusters. The slave data center may be responsible for receiving and storing replicated data transmitted from the master data center. The slave data center may also be configured to execute queries on data stored in the slave data center. In this way, the slave data center may store an up-to-date copy of the data stored in the primary data center while providing load balancing for queries to the data.

In some implementations, one or more components in a slave data center may be placed in a disabled or deactivated state. For instance, in the system shown in FIG. 5, the console 522, the cluster monitor 534, the query dispatcher 526, and the parallel ETL 530 are placed in a disabled or deactivated state. When a component is placed in such a state, the functioning of the component may be suspended. However, the component may be ready to resume functioning upon request, for instance if one or more primary data operations are transferred from one data center to the other data center.

At each of 502 and 522, a console server is shown. According to various embodiments, the console may be responsible for receiving from a query client requests to query the data stored in the data center. For instance, the console may receive requests to retrieve, alter, summarize, or otherwise analyze records stored in the data center.

At each of database 504 and 524, a database is shown. According to various embodiments, the database may store any information related to the data stored in the data centers and/or the data clusters on which the data is stored. For example, the database may store queries received from the console. As another example, the database may store query results of the queries received from the console and executed on the data cluster. The database may also store data cluster status information or other metadata describing an operating status of the data cluster. For instance, metadata records may map particular sets of data tables (including each data table's file location, table name, and schema, etc.) to particular identifiers for specific data store instances. Any of the data stored within a database may also be accessible by any other component of the database storage system, as well as being provided outside of the system.

In a specific implementation, each database 504 and 524 may include any suitable number and type of storage instances, which may be centrally located relative to the other components of the system 500, by way of example. The database storage 504 and 524 may also be implemented in a high availability system, such as Zookeeper as one or more metadata tables in My SQL or the like. Some instance operational or status information (e.g., disk usage, may be maintained by Zookeeper ephemeral nodes. The metadata may also be stored as multiple replicas for high availability. For example, the multiple replication solution from XtraDB MySQL cluster (which is available from Percona of Durham, N.C.) works well. A write to a Percona cluster is successful only if all writes to all of the live replicas are successful. Alternatively, a weaker form of eventual consistency can be achieved by using the open source Tungsten replicator, which is available from Google of San Francisco, Calif. The replication mechanism for Tungsten is asynchronous, which may work for writes that do not conflict with the same "cell", so that there will not be conflicts and eventual consistency can be achieved. Alternatively, each cluster instance may maintain its own metadata.

In particular embodiments, the database may be associated with one or more backups. A backup database may be used to continue operations in the event of failure at the primary database. Alternately, or additionally, a backup database may be used to restore the primary database to an earlier state.

In particular embodiments, the database at the master data center may be replicated to the slave data center. The database replication may be performed via any suitable database replication technology. By replicating the database from the master data center to the slave data center, the slave data center may have a stored copy of queries, collected and estimated resource metrics (e.g., map time, reduce time, total execution time, total elapsed time, etc.), query results, and data cluster status information in the event of failure of either the master database or the entire master data center site.

At each of 506 and 526, a query dispatcher 506 is shown. According to various embodiments, the query dispatcher may be configured to retrieve queries from the database 504. The query dispatcher may also be configured to update status or metadata information for queries stored in the database. For example, the query dispatcher may update query status information to indicate that a query has been removed from a queue and is now being executed. As another example, the query dispatcher may update query status information to indicate that a query has been completed.

In some implementations, query dispatcher 506 may be configured to perform load balancing to execute queries on either the master or slave data cluster. For instance, the query dispatcher may retrieve cluster status information from the database 504 and determine whether the master or slave data cluster is better suited to execute a new query. When the query dispatcher selects which data cluster should execute a new query, the query dispatcher may transmit the query to the analytics engine associated with the selected data cluster. For instance, the query dispatcher 506 may transmit the query to the analytics engine 508 at the master data center or the analytics engine 528 at the slave data center. Query dispatcher 506 may also be configured to halt a query's execution when the query client indicates that he/she wishes to proceed with the query, for example, via console 502.

At each of 508 and 528, an analytics engine is shown. According to various embodiments, the analytics engine may be configured to receive queries from a query dispatcher for execution on the data cluster. When a query is received, the analytics engine may execute the query on the data cluster. Executing the query may involve retrieving or altering information stored on the data cluster.

The analytics engine 508 and 528 (and/or query dispatchers) may also be configured to collect query metrics, such as the amount of time for the query's execution, map execution, reduce execution, elapsed time, the number of input bytes that have been processed, the number of results that have been produced, etc. As a query executes on one or more instances, such instances' task tracker may collect various resource usage metrics (e.g., along with the query results). In general, each data instance or node is aware of its own map and reduce operation's execution, including start and finish time, CPU usage, and I/O usage. The query dispatcher (or other component) may request such metrics from the instances using a specifically configured API for obtaining metrics on the various tasks that are executing on a particular data node. The query dispatcher may also be configured to provide any suitable type of metadata (such as query time) to a query server and/or client, for example, when a query is completed.

The resource metrics for each metric may be stored at each instance or collected and stored as central metadata for all the instances. These metrics data sets may be deleted after the model for the corresponding query is adjusted or it is determined that such model does not need adjusting.

In certain embodiments, the analytics engines 508 and 528 (or other components) may also be configured to collect and provide resource metrics on demand on a per query, job, or task basis. The analytics engine 508 or 528 executes each particular query in parallel, using the Hadoop MapReduce framework. In other words, the analytics engine 508 or 528 constructs one or more MapReduce jobs based on a particular input query, and submits each job to the Hadoop MapReduce framework for execution. The analytics engine can maintain a picture of each query's status, such as scheduling specifications, execution status, idling status, etc. The Hadoop MapReduce framework keeps track of all jobs running, including the query job, and collects and logs job status data. This resource information can be accessed and used for model training and cost estimating by making a request to the Hadoop MapReduce framework via the analytics engine 508 or 528, by way of example.

In certain use cases, advertisers may want to know how well their campaign(s) or sub-campaign(s) are performing on certain domains and subdomains. In other use cases, data providers may wish to see how much a particular user segment is being used by different advertisers. In both cases, joined data for certain frequently queried join results may be precomputed, instead of joining on the fly, to reduce latency. For instance, joins on different hierarchies of performance data may be precomputed. Examples of hierarchies from which data may be joined may include advertiser (advertiser, campaign and creative), publisher (domain, subdomain) and data provider (data provider and user segment). There could be many combinations of interests to query clients/customers. Additionally, clients may wish to perform queries on different date ranges, including long date range time series, for different combinations of interests. To allow clients to quickly query their desired data, certain data combinations can be pre-extracted using a MapReduce to precompute all of such aggregated reporting data for different date ranges in batches and different combinations of interests. Regardless of the query type, the execution and elapsed time or other resource metrics may be tracked and optionally provided to the client.

In a specific example, multiple queries on a particular multi-relation operation (e.g., join Tables A and B) can be received into the console, which is forwarded to the correct instance(s), from which query results and metrics may be provided. If it is determined that the same particular query is likely to be received in the future based on the statistics that are collected for receiving such a particular query, handling of the multi-relation operation may be pushed to the analytics engine, which can then populate the join/product/intersection/difference data table for the query. The computation output can then be loaded into the system. The query server can determine when the data table output is available in the data store system (via being loaded into one or more instances and published). The computation output is then available for subsequent multi-relation queries of the same type. Additionally, common combinations (or joins), such as time series joins, can be pre-computed periodically and stored as new "joined" tables that can be readily available to subsequent queries without performance of another join operation.

In another example, a multi-relation query may be converted to a language that is supported by the database system at which the data tables are externally stored outside database system 500. In the illustrated embodiment, the query is an SQL type query, and the data tables are stored in a Hadoop DFS. In this example, the SQL multi-relation query is converted into MapReduce operations on the DFS data table.

One example of a distributed file system is the Hadoop Distributed File System (HDFS)®, which includes several Hadoop® clusters specifically configured for processing and computation of the received log files. For example, data storage system 110 may include two Hadoop® clusters where a first cluster is a primary cluster including one primary namenode, one standby namenode, one secondary namenode, one Jobtracker, and one standby Jobtracker. The secondary nodes may be utilized for recovery, backup, and time-costing queries.

Furthermore, data storage system 110 may be implemented in one or more data centers utilizing any suitable multiple redundancy and failover techniques. By way of a specific embodiment, all the modules in Hadoop are designed with a fundamental assumption that hardware failures (of individual machines, or racks of machines) are commonplace and, thus, are automatically handled in software by the framework. The term "Hadoop" has come to refer not just to the base modules above, but also to the "ecosystem", or collection of additional software packages that can be installed on top of or alongside Hadoop, such as Apache Pig, Apache Hive, Apache HBase, Apache Spark, and others. In general, a Hadoop-compatible file system provides location awareness: the name of the rack (more precisely, of the network switch) where a worker node is. Hadoop applications can use this information to run work on the node where the data is, and, failing that, on the same rack/switch, reducing backbone traffic. HDFS uses this method when replicating data to try to keep different copies of the data on different racks. The goal is to reduce the impact of a rack power outage or switch failure, so that even if these events occur, the data may still be readable. Various embodiments disclosed herein may also utilize other frameworks, such as .NET or grid computing.

At each of 512 and 532, a data cluster is shown. The data cluster may include one or more storage servers working together to provide performance, capacity, and reliability. In many configurations, the data cluster may include many different storage servers that together provide petabytes, exabytes, or more of storage space. The data clusters shown in FIG. 5 may be configured to use the open-source Apache Hadoop framework. However, any storage framework suitable for storing and accessing large amounts of data may be employed. For instance, a data cluster may be implementing using a framework such as Spark, Stratosphere, or Zillabyte.

The data clusters may comprise any suitable number of storage instances that pertain to any suitable type and amount of data or data pointer/reference. Each storage instance may take any suitable physical form and use any suitable database protocol, such as a cluster of relational database management system (RDBMS) instances to store and serve data, such as tables, and which support SQL type queries. By way of examples, MySQL, Cheetah-QL (CQL), Oracle, or PostgresSQL-compatible instances, which support ACID (Atomicity, Consistency, isolation, Durability) compliant and transactional queries, may be implemented. Each instance may include at least two components, by way of example: 1) a local RDBMS instance for storing data and 2) an agent (or task tracker) for monitoring map and reduce tasks/jobs running on the same machine. In a specific implementation, the agent is implemented as a Java process, and MySQL is used as the underlying local RDBMS instance.

In a specific implementation, an ephemeral node is maintained for each instance so that liveness can be effectively indicated by the absence or presence of such data for a particular instance. Each instance node or record may contain an identifier and information pertaining to the instance's capabilities for loading data, such as available disk space size or percentage (e.g., Size1), CPU usage (e.g., CPU1), etc. The instance ID may specify instance location or data center location information, as well as an instance name/ID. At least a portion of instance status indicators may also be used during a new or updated data table loading process to determine assignment of tables to specific instances. Additionally, these instance status indicators may also contain job/task identifiers, an indication as to whether each job/task is running, completed, and its time duration. This assignment information may be monitored to determine if data has been assigned to new instance(s), which assignment change may trigger the process for determining whether to rerun and/or adjust a model. These instance status indicators can be queried to determine resource usage for each executed query.

Additionally, when an instance's usage goes above a particular threshold (e.g., low disk space) or reaches maximum capacity, an alarm may be triggered. This alarm may cause the loading interface to offload tables from the overloaded instance by deleting records for such instance. The loading interface may remove data for a particular instance for any suitable reason, such as redistribution or in response to a client deleting a particular table.

Other metrics may be used to assign data to particular instances. Example metrics may include one or more of the following: available disk space size or percentage, CPU usage, a location of the instances (e.g., location of the server or data center), schema of the instances, username of the instances, etc.

In a specific implementation, file access for the HDFS framework can be achieved through the native Java API, the Thrift API to generate a client in the language of the users' choosing (C++, Java, Python, PHP, Ruby, Erlang, Perl, Haskell, C #, Cocoa, Smalltalk, and OCaml), the command-line interface, browsed through the HDFS-UI web app over HTTP, or via 3rd-party network client libraries.

Data may be loaded into the RDBMS instance, for example, on the same machine. After each specified instance loads its new or updated data, the instance (e.g., via the agent) may then publish the loaded data with respect to the metadata store as a resource.

Any changes in the database system may affect when to rerun a model for estimating query resource usage and when to determine whether to adjust a model. For instance, the output of the model may be compared to actual results only when a change occurs in an operating parameter of the database system and how it handles queries. Possible database changes that may trigger a model re-execution and/or adjustment analysis may include, but not limited to, changes in instance assignment for data, changes in instance functioning, changes in which tasks are (or are not) offloaded to external servers, changes in available disk space or CPU resources, changes in client resource allocation, etc.

According to various embodiments, the data cluster may store any of various types of information. For example, in one configuration the data cluster may store advertising analytics information that includes user data for advertising audience members. Such data may include user demographics information and/or user responses to digital advertisements. However, in other configurations the data cluster may store any type of high-volume data suitable for storage in a data storage cluster.

At each of 510 and 530, a parallel ETL is shown. In some implementations, the data may be ingested in to the data cluster via the parallel ETL. The parallel ETL may be responsible for extracting data from homogenous or heterogeneous data sources, transforming the data for storing it in the proper format in the data cluster, and loading it into the data cluster.

In particular embodiments, the parallel ETL may be configured to perform one or more different storage operations simultaneously. For instance, while data is being pulled in by one process, another transformation process may process the received data. Then, the data may be loaded into the data cluster as soon as transformed data is available for loading, without waiting for either or both of the earlier processes to be completed.

According to various embodiments, data may be replicated from the master data center cluster to the slave data center cluster. For example, data may be transferred from the master data center cluster to the slave data center cluster periodically, such as once every hour. As another example, data may be transferred when a calculated difference in the data stored on the two data clusters reaches a designated threshold. The data may be transfer via any suitable technique for replicating data, such as in one or more compressed data storage containers.

At each of 514 and 534, a cluster monitor is shown. According to various embodiments, the cluster monitor may be configured to receive information from one or both of the master data cluster and the slave data cluster. The information may include metadata that characterizes the contents and operations of the data cluster. For example, the cluster monitor may be configured to receive query results from the data cluster and store the query results in the database. As another example, the cluster monitor may be configured to receive status information from the data cluster that indicates the current processing load of the data cluster, the operational status of the data cluster, or other such information as described further herein. For instance, the cluster may transmit to the cluster monitor an indication as to whether the data cluster is fully operational or whether one or more portions of the data cluster have failed. As another example, the cluster monitor may be configured to collect and receive data storage information such as space usage, a number of files stored, a number of queries being executed, execution time, elapsed time, CPU usage, etc.

According to various embodiments, the system shown in FIG. 5 may be configured for disaster recovery and high availability. For example, the system may be capable of gracefully responding to a failure of either one or more components at the master data center and/or the entire master data center.

According to various embodiments, the components shown in FIG. 5 may be implemented in software, hardware, or a combination thereof as further described herein. In some instances, a component may be implemented in specialized hardware configured to perform particular data processing tasks. For example, any or all of the console 502, the database 504, the query dispatcher 506, the analytics engine 508, the cluster monitor 514, and the parallel ETL 510 as well as their counterparts in the slave data center may be implemented as customized hardware components configured to perform specific data processing tasks or any type of hardware, for example, as described herein.

In some implementations, any of the components shown in FIG. 5 may be backed up by duplicate components ready to take over in the event of failure of the primary component. A data center may experience any of various types of failures, all of which the techniques and mechanisms described herein may be used to track various changes in the resource usage. These failures may include, but are not limited to: network failures, power failures, cooling failures, data cluster failures, hardware failures, software failures, or catastrophic failures of an entire data center.

In some implementations, the components within a data center may communicate via high speed network links such as 200 gigabit, 1 terabit Ethernet, or even faster connections. Components across data centers may communicate via customized high speed network links or via public networks such as the Internet.

The disclosed techniques of the present invention may be implemented in any suitable combination of software and/or hardware system, such as a web-based server or desktop computer system. An apparatus for implementing one or more portions of this invention may be specially constructed for the required purposes, or it may be a computer selectively activated or reconfigured by a computer program and/or data structure stored in the computer. The processes presented herein are not inherently related to any particular computer or other apparatus. In particular, various general-purpose machines may be specifically configured with programs written in accordance with the teachings herein, or it may be more convenient to construct a hardware specialized apparatus to perform the disclosed method steps.

Figure 6:
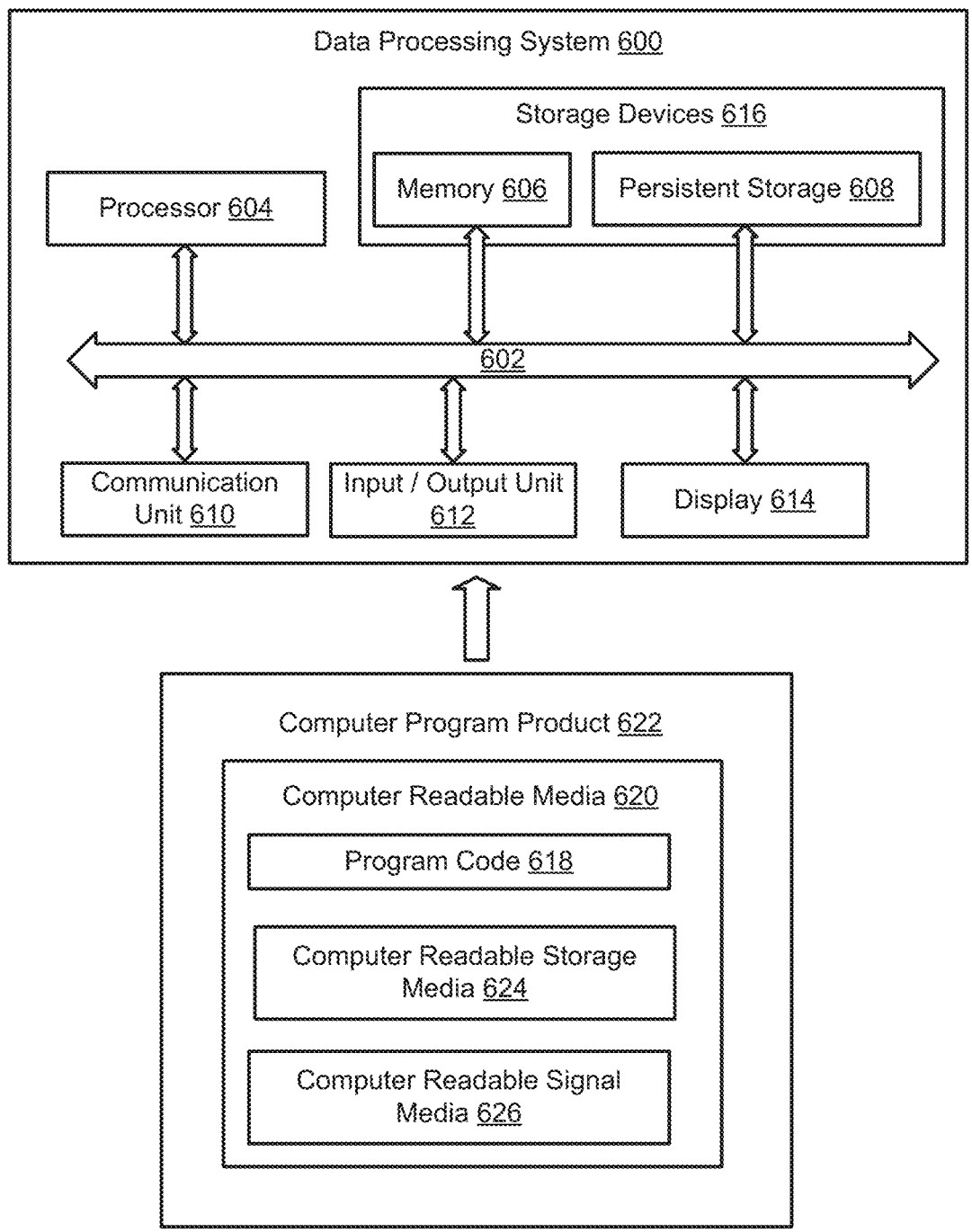
FIG. 6 illustrates a typical computer system that, when appropriately configured or designed, can implement as least portions of the table-level process embodiments described herein.

FIG. 6 illustrates a data processing system configured in accordance with some embodiments. Data processing system 600, also referred to herein as a computer system, may be used to implement one or more computers or processing devices used in a controller, server, or other components of systems described above. In some embodiments, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, as may be included in a multi-processor core. In various embodiments, processor unit 604 is specifically configured to process large amounts of data that may be involved when processing queries associated with one or more query clients or other types of data, as discussed above. Thus, processor unit 604 may be an application specific processor that may be implemented as one or more application specific integrated circuits (ASICs) within a processing system. Such specific configuration of processor unit 604 may provide increased efficiency when processing the large amounts of data involved with the previously described systems, devices, and methods. Moreover, in some embodiments, processor unit 604 may include one or more reprogrammable logic devices, such as field-programmable gate arrays (FPGAs), that may be programmed or specifically configured to optimally perform the previously described processing operations in the context of large and complex data sets sometimes referred to as "big data."

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626.

In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code 618.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

The invention claimed is:

1. A system for managing queries on on-line advertisement data, the system comprising:
one or more console servers configured for receiving queries for a plurality of query clients from a corresponding plurality of query client devices and outputting query results to such corresponding query client devices, wherein the queries utilize a flexible protocol and upon execution vary significantly in complexity, data input size, cluster usage, and results, wherein execution of each received query is to be distributed and processed across a plurality of cluster nodes;
one or more processors configured for:
generating an initial model having a plurality of weights for applying to each of a plurality of different feature vectors of a plurality of queries, which are received for a plurality of query clients via a plurality of query devices, so as to predict an estimation of resource usage for execution of each query, each query's corresponding feature vector having a plurality of values pertaining to the query and a system status, wherein each query's corresponding feature vector includes input data items from the query's content and database parameter items for specifying different types of queried data for execution of the query and that are not specified in the query's content and wherein the input data items pertain to at least the query's complexity, data input size, cluster usage, and results,
prior to adjusting the weights of the initial model for a particular one of the query clients, tracking actual resource usage during execution of each of a first set of received queries for the particular query client, and
dynamically adjusting the weights of the initial model for the particular query client to generate an adjusted model for individual use with the particular query client's subsequently received queries, wherein the weights are only adjusted if a condition is met when comparing actual resource usage and estimation of resource usage for executing a current query for the particular query client;
the one or more console servers being further configured to provide the estimation of resource usage for each query to the corresponding query client device and thereafter, in response to receipt of the estimation by the corresponding query client device, receive input from such corresponding query client device and specifying whether to proceed with the corresponding query; and
a database system, or the one or more console servers being further configured, for receiving input from each query's corresponding query client device as to whether to proceed with the query and, in response, initiating or inhibiting execution of such query with respect to a database storage system.

2. The system of claim 1, wherein the estimation of resource usage for each query is further based on user profile data that specifies which resources are allocated for a query client of such query, including percentage or number of server nodes, percentage or number of mapper and reducer nodes, and priority of jobs.

3. The system of claim 1, wherein the estimation of resource usage for each query specifies a predicted elapsed time, CPU usage, or I/O usage for such query.

4. The system of claim 3, wherein the estimation of resource usage for each query further specifies a predicted execution time, including map time and reduce time, for such query.

5. The system of claim 1, wherein the condition is met for the particular query client if the actual resource usage for executing such particular query client's query differs from the estimation of resource usage of such particular query client's query by a predefined threshold.

6. The system of claim 1, wherein the one or more processors are further configured to dynamically customize a different model for each query client.

7. The system of claim 1, wherein the different feature vectors include different values for a plurality of query parameters for each query's content, a plurality of execution parameters for each query, a plurality of database system resource allocation specifications for each query client, and a plurality of database system operating parameters.

8. The system of claim 7, wherein the different values for the query and execution parameters include different values for type and number of tables, different values for number and type of list function tables, different values for number and type of columns in each referenced table, different values for number and types of nesting, and different values for type of filtering condition.

9. The system of claim 8, wherein the different values for type of tables include user data tables, impressions tables, clicks tables, actions tables, nested impressions tables, nested clicks tables, and nested data tables, wherein the different values for type of list function tables include functions correlated and not correlated with a target table.

10. The system of claim 7, wherein the different values for the query and execution parameters include different sets of queried data types and corresponding query protocols.

11. The system of claim 7, wherein the different values for the execution parameters include number or percentage of number of jobs, number or percentage of nodes, number or percentage of available map slots, number or percentage of available reducer slots.

12. The system of claim 1, wherein the one or more console servers are further configured to provide a suggestion to each query client device for changing its query so as to reduce the query's estimation of resource usage to the query client device, wherein the suggestion includes a predefined number of feature vector values that contribute the most to the estimation of resource usage.

13. A method of managing queries on on-line advertisement data, comprising:
receiving queries for a plurality of query clients from a corresponding plurality of query client devices, wherein the queries utilize a flexible protocol and upon execution vary significantly in complexity, data input size, cluster usage, and results, wherein execution of each received query is to be distributed and processed across a plurality of cluster nodes;
generating an initial model having a plurality of weights for applying to each of a plurality of different feature vectors of a plurality of queries, which are received for a plurality of query clients via a plurality of query devices, so as to predict an estimation of resource usage for execution of each query, each query's corresponding feature vector having a plurality of values pertaining to the query and a system status, wherein each query's corresponding feature vector includes input data items from the query's content and database parameter items for specifying different types of queried data for execution of the query and that are not specified in the query's content and wherein the input data items pertain to at least the query's complexity, data input size, cluster usage, and results;
prior to adjusting the weights of the initial model for a particular one of the query clients, tracking actual resource usage during execution of each of a first set of received queries for the particular query client;
dynamically adjusting the weights of the initial model for the particular query client to generate an adjusted model for individual use with the particular query client's subsequently received queries, wherein the weights are only adjusted if a condition is met when comparing actual resource usage and estimation of resource usage for executing a current query for the particular query client; and
providing the estimation of resource usage for each query to the corresponding query client device and thereafter, in response to receipt of the estimation by the corresponding query client device, receive input from such corresponding query client device and specifying whether to proceed with the corresponding query.

14. The method of claim 13, wherein the estimation of resource usage for each query specifies a predicted elapsed time for such query and a predicted execution time, including map time and reduce time, for such query, including percentage or number of server nodes, percentage or number of mapper and reducer nodes, and priority of jobs.

15. The method of claim 13, wherein the condition is met for the particular query client if the actual resource usage for executing such particular query client's query differs from the estimation of resource usage of such particular query client's query by a predefined threshold.

16. The method of claim 13, further comprising dynamically customizing a different model for each query client.

17. The method of claim 13, wherein the different feature vectors include different values for a plurality of query parameters for each query's content, a plurality of execution parameters for each query, a plurality of database system resource allocation specifications for each query client, and a plurality of database system operating parameters.

18. The method of claim 16, wherein the different values for the query and execution parameters include different values for type and number of tables, different values for number and type of list function tables, different values for number and type of columns in each referenced table, different values for number and types of nesting, and different values for type of filtering condition.

19. The method of claim 18, wherein the different values for type of tables include user data tables, impressions tables, clicks tables, actions tables, nested impressions tables, nested clicks tables, and nested data tables, wherein the different values for type of list function tables include functions correlated and not correlated with a target table.

20. The method of claim 13, further comprising: providing, to each query client device, a suggestion for changing its query if the condition is met so as to reduce the query's estimation of resource usage to the query client device, wherein the suggestion includes a predefined number of feature vector values that contribute the most to the estimation of resource usage.

21. One or more non-transitory computer readable media having instructions stored thereon for performing a method, the method comprising:
receiving queries for a plurality of query clients from a corresponding plurality of query client devices, wherein the queries utilize a flexible protocol and upon execution vary significantly in complexity, data input size, cluster usage, and results, wherein execution of each received query is to be distributed and processed across a plurality of cluster nodes;
generating an initial model having a plurality of weights for applying to each of a plurality of different feature vectors of a plurality of queries, which are received for a plurality of query clients via a plurality of query devices, so as to predict an estimation of resource usage for execution of each query, each query's corresponding feature vector having a plurality of values pertaining to the query and a system status, wherein each query's corresponding feature vector includes input data items from the query's content and database parameter items for specifying different types of queried data for execution of the query and that are not specified in the query's content and wherein the input data items pertain to at least the query's complexity, data input size, cluster usage, and results;

prior to adjusting the weights of the initial model for a particular one of the query clients, tracking actual resource usage during execution of each of a first set of received queries for the particular query client;

dynamically adjusting the weights of the initial model for the particular query client to generate an adjusted model for individual use with the particular query client's subsequently received queries, wherein the weights are only adjusted if a condition is met when comparing actual resource usage and estimation of resource usage for executing a current query for the particular query client; and providing the estimation of resource usage for each query to the corresponding query client device and thereafter, in response to receipt of the estimation by the corresponding query client device, receive input from such corresponding query client device and specifying whether to proceed with the corresponding query.

* * * * *